Sept. 29, 1942. W. C. VAN DRESSER ET AL 2,297,088
UPHOLSTERY PAD SUPPORT FOR MARGINS OF SPRING CUSHION ASSEMBLIES
Filed March 14, 1941 2 Sheets-Sheet 1
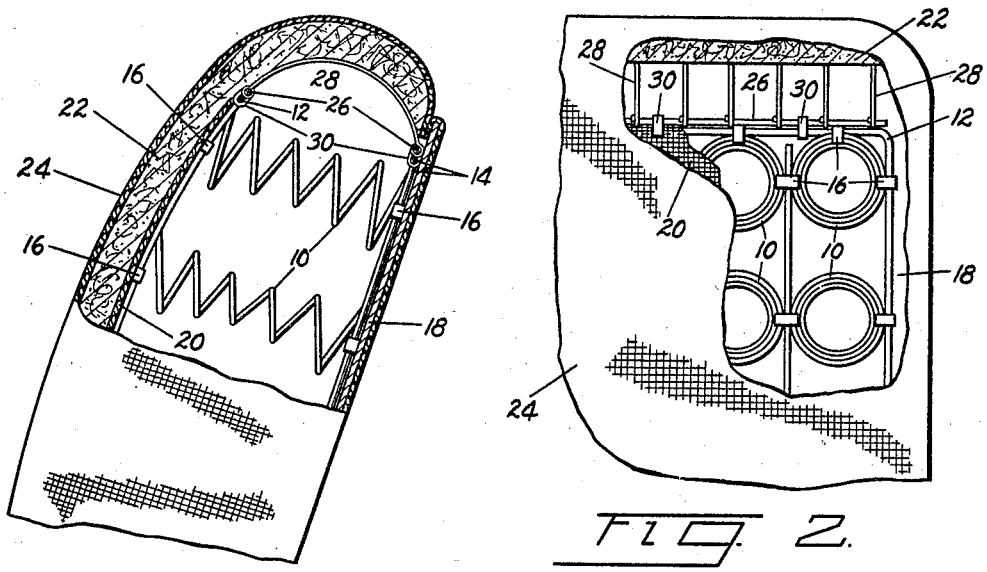
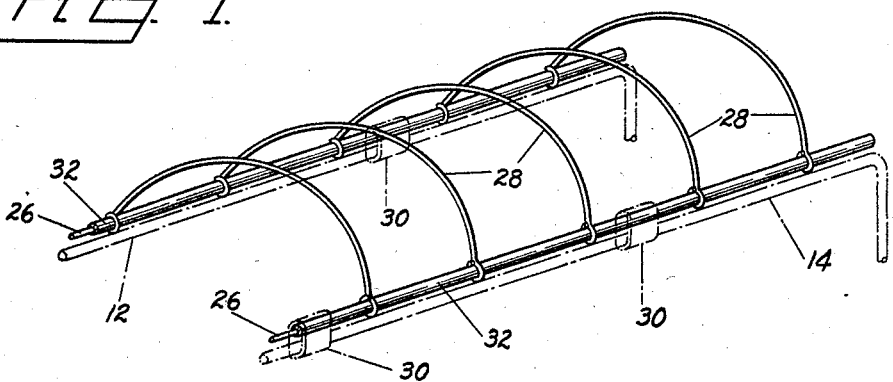
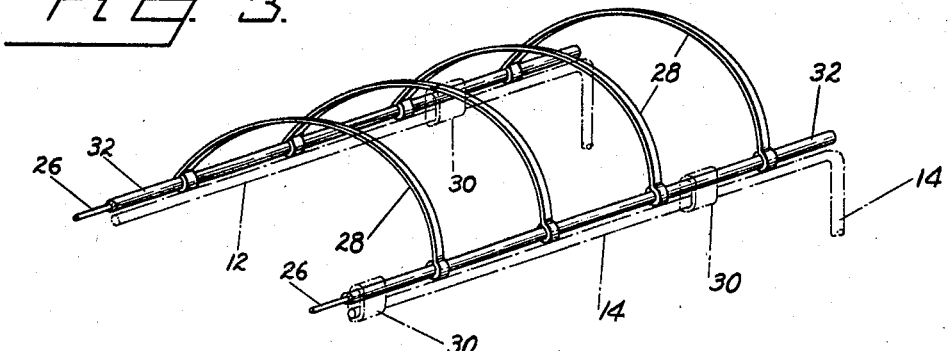
INVENTORS.
William C. Van Dresser &
BY Edson D. Metty
Parker & Burton
ATTORNEYS.

Patented Sept. 29, 1942

2,297,088

UNITED STATES PATENT OFFICE 2,297,088

UPHOLSTERY PAD SUPPORT FOR MARGINS OF SPRING CUSHION ASSEMBLIES

William C. Van Dresser and Edson D. Merry, Detroit, Mich., assignors to Van Dresser Specialty Corporation, Detroit, Mich., a corporation of Michigan Application March 14, 1941, Serial No. 383,398

2 Claims. (Cl. 155—181)

This invention relates to an upholstery pad support for the margin of spring cushion assemblies such as the helical spring cushion assembly used in automobile seats. More particularly it is directed to a pad support for the top margin of a spring cushion back assembly of an automobile seat.

The object is to provide an improved padding support for the margin of a spring cushion assembly which will serve to keep the upholstery pad and trim material from collapsing inwardly within the margin of the spring cushion between the helical springs which make up such spring margin and to provide such a padding support in linear strip form which may be cut off in desired lengths and which forms a complete self-contained unit. It may be readily attached to the margin of any spring cushion assembly regardless of its character or size and it will effectively prevent the wadding or upholstery padding material from collapsing or wedging into the interior of the spring cushion as between the individual springs which make up such cushion.

A further object is to provide such a padding support of a unitary self-contained character which is simple, inexpensive, easy to use, and attach in place and which will effectively serve the purpose.

Figure 5:
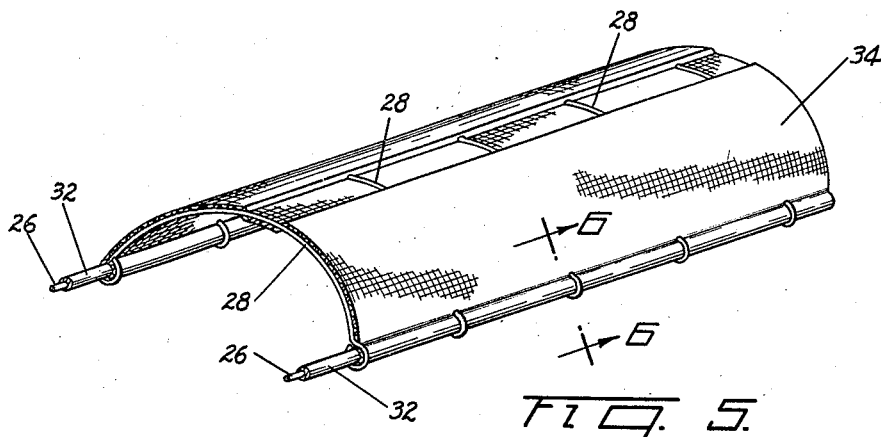
Figure 6:
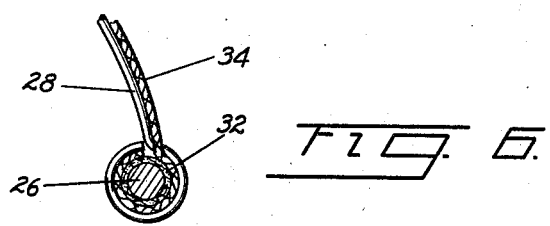
Figure 7:
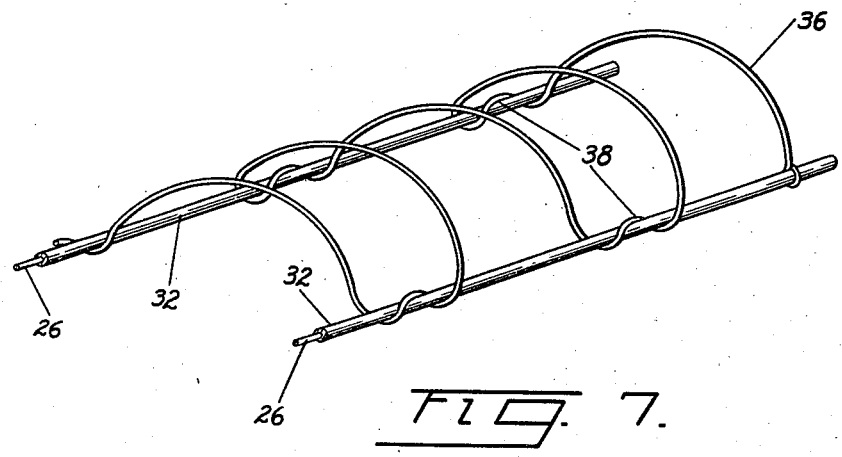

Other objects, advantages and meritorious features of the invention will more fully appear from the following description, appended claims, and accompanying drawings, wherein:

Figure 1 is an elevation partly broken away of an automobile seat back showing this improved padding support attached to the spring cushion assembly, Fig. 2 is a fragmentary elevation also partly broken away and at right angles to the illustration of Fig. 1, Fig. 3 is a perspective of a fragment of the padding support shown as attached to the boundary wires of a spring cushion assembly, Fig. 4 is a perspective of a fragment such as is shown in Fig. 3 slightly modified in construction, Fig. 5 is a perspective of a fragment of a structure embodying my invention such as shown in Fig. 3 but including, in addition, fabric sheet material secured thereto in an improved manner, Fig. 6 is a sectional view taken on line 6—6 of Fig. 5, Fig. 7 is a fragmentary perspective of a section of the padding support but modified slightly in structure as compared with the construction of Fig. 3.

Heretofore spring cushion assemblies have in some instances been provided with fabric, such as burlap, stretched across their margins between the boundary wires. In some instances cross wires woven thereacross were combined with the burlap or used independently thereof. In each case whether burlap or cross wires or both were employed the object was to prevent the padding from collapsing into the interior of the spring cushion. Such constructions, however, formed an integral part of the spring cushion make up and were generally built into the spring cushion by the spring manufacturer.

This improved construction forms a unitary self-contained readily handled and easily attached strip element which may be quickly secured in place at the trim shop and which is readily adaptable to any spring cushion margin and may be provided in any desired length and does not require skilled labor. It constitutes an independent but complete supplemental assembly attachable as a unit to the spring cushion assembly. In Fig. 1 there is shown a fragment of an automobile seat back wherein the spring cushion assembly includes a plurality of helical springs 10 secured to the usual supporting wires, including front boundary wire 12 and back boundary wire 14, along the top margin of the assembly. The helical springs are secured by clips 16 to the boundary wires and to the supporting wires. A rear trim panel 18 is secured in place in any suitable manner. Burlap or other supporting sheet material 20 may be stretched over the front face of the spring cushion assembly and over this burlap 20 is placed a layer of wadding or suitable padding material 22 covered by the usual trim cloth 24.

This invention comprises a padding support in the form of a self-contained unitary spring strip assembly consisting of two linearly extending supporting wires 26. A plurality of arched spring crown wires 28 are secured to and extend between these supporting wires in spaced apart relationship therealong as shown in Figs. 2, 3, 4 and 5 of the drawings. The supporting wires 26 are clipped or otherwise secured to the front and back margins of the spring cushion assembly at the top. They are here shown as secured by clips 30 to the boundary wires 12 and 14.

In Figs. 3 to 6 the supporting wires 26 are shown as having a covering 32 such as paper wrapped thereabout so that the engagement of the crown wires therewith will be more secure and exhibit less tendency to slip therealong though it is obvious that this paper binding might be omitted and the crown wires secured directly to the supporting wires as shown in Figs. 1 and 2. In Fig. 4 the crown wires 28 are flat.

In Fig. 5 a strip of burlap or other suitable sheet material is employed in conjunction with the crown wire support and in such figure the burlap strip 34 extends between the supporting wires and overlies the crown wires. The burlap strip has its margins folded about the supporting wires 26 and the crown wires are threaded through the burlap from underneath adjacent each supporting wire and wrapped thereabout and about the fold of the sheet to secure the burlap to the supporting wire along each margin. This is shown in Figs. 5 and 6. The crown wires may be threaded through the burlap strip at the top, or the fabric sheet may overlie the crown wires throughout except for the threading of the crown wires therethrough adjacent to each supporting wire.

In Fig. 7 the spring crown wires are shown as formed from a single sinuous wire 26 wrapped zigzag between the supporting wires 26 and wrapped thereabout as at 38 so as to space successive segments thereof apart in order that they will serve the same purpose as the spaced separate sections of Figs. 3 and 4.

What we claim:

1. An upholstery pad support for the margin of an upholstery spring cushion assembly comprising a linear fence like structure consisting of a pair of parallel spaced apart marginal supporting wires and a plurality of arched spring crown wire sections secured at opposite ends to said two supporting wires and extending therebetween and arranged in spaced apart relationship therealong, and a fabric sheet extending between the supporting wires following the curvature of the crown wires, each crown wire having its intermediate portion threaded through the sheet and its ends adjacent the marginal wires threaded therethrough, the margins of the sheet folded about the supporting wires and the ends of the crown wires wrapped thereabout and about said folded margins of the sheet.

2. An upholstery pad support for an upholstery spring cushion assembly comprising a linear fence like structure consisting of a pair of parallel spaced apart supporting wires and a plurality of cross wires secured at opposite ends to said two supporting wires and extending therebetween and arranged in spaced apart relationship therealong, and a flexible fabric sheet overlying said cross wires and extending between said supporting wires and having its margins folded about the supporting wires, each cross wire having its ends threaded through the sheet from underneath and adjacent to each supporting wire and wrapped about the supporting wire and about the margin of the sheet folded about the supporting wire.

WILLIAM C. VAN DRESSER.
EDSON D. MERRY.